United States Patent [19]

Cooper

[11] Patent Number: 4,793,090
[45] Date of Patent: Dec. 27, 1988

[54] WEEDLESS HOOK ATTACHMENT

[76] Inventor: Dennis K. Cooper, 4010 S. Lyons Ave., Indianapolis, Ind. 46241

[21] Appl. No.: 179,573

[22] Filed: Apr. 8, 1988

[51] Int. Cl.[4] ............................................. A01K 85/00
[52] U.S. Cl. ..................................... 43/42.43; 43/43.6
[58] Field of Search ................... 43/42.43, 42.4, 42.42, 43/42.6, 43.2, 44.82

[56] References Cited

U.S. PATENT DOCUMENTS

| 2,450,796 | 10/1948 | Heimark | 43/43.6 |
| 2,466,101 | 4/1949 | Harrison | 43/43.6 |
| 2,932,114 | 4/1960 | Meucci | 43/43.6 |
| 4,312,148 | 1/1982 | Hardwicke | 43/42.43 |

FOREIGN PATENT DOCUMENTS

| 986185 | 3/1951 | France | 43/43.6 |
| 1295573 | 5/1962 | France | 43/42.43 |
| 2481576 | 11/1981 | France | 43/43.2 |

Primary Examiner—Gene P. Crosby
Attorney, Agent, or Firm—Woodard, Emhardt, Naughton Moriarty & McNett

[57] ABSTRACT

A weedless hook attachment includes a central hub with a plurality of legs emanating radially therefrom, formed of a flexible, resilient and compressible plastic. The plurality of legs have approximately the same diameter, the diameter being approximately equal to or greater than the diameter of the eye on the fishing hook onto which the weedless hook attachment is to be engaged. In the preferred embodiment of the invention for use with a treble hook, the hook attachment includes a pair of legs having a necked-down portion between the leg and the central hub. A third starter leg includes a starter nub projecting from the free end of the starter leg that has a diameter smaller than the diameter of the eye of the fish hook. In use, the starter nub is threaded through the eye of the treble hook and is used to pull the starter leg through the eye. The starter leg is threaded through the eye until the necked-down portions of the remaining legs are situated in the eye. The starter nub is severed from the end of the starter leg, and the starter leg and the remaining legs are impaled on the barbs of the treble hook. The weedless hook attachment conceals barbs and prevents the treble hook from becoming snagged on underwater weeds and brush, without significantly affecting the action of the lure to which the treble hook is attached.

10 Claims, 1 Drawing Sheet

WEEDLESS HOOK ATTACHMENT

BACKGROUND OF THE INVENTION

This invention is in the field of fishing tackle, and more particularly, relates to an attachment for a fishing hook.

Of the many obstacles facing a fisherman in search of the elusive "one that got away", one of the more frustrating problems is presented by underwater brush, weeds, or other obstacles. Although underwater brush and weeds are attractive habitat for many varieties of fish, these same underwater flora all too often present an unavoidable snag or trap for the fisherman's favorite lure or jig. The same element of the fishing lure that is responsible for snagging a fish, that is the hook, is susceptible itself to being snagged on underwater brush or weeds. The likelihood that a lure or jig will become entangled in underwater weeds is increased with the number of hooks on the lure—that is, a treble hook provides three times the number of "snagging" barbs than a single barb hook.

In search of a "weedless" hook that is less susceptible to being snagged by underwater brush and weeds, prior fishermen have been drawn to certain weedless devices of the prior art that include a thin, flexible metal strip attached to the jig head that extends over the barb of the fish hook. The thin metal strip is pushed aside from the barb when the lure and hook are struck by a fish. In a variation on this type of weedless jig, another jig head of the prior art includes a flexible member mounted to the jig head into which the barb of the hook is transfixed or implanted. In the case of both of these weedless jigs of the prior art, the weedless feature is adapted for use on a single hook only, being generally unusable with treble or twin hooks. Moreover, these weedless jigs are cumbersome and time-consuming to use because it is first necessary to remove the hook from the lure in order to attach the weedless feature. These weedless jig heads are particularly detrimental to the action of lures, such as lures with cupped bills, spinner plugs, and jointed lures.

In view of the ever-present need for a weedless hook, and in view of the significant limitations of the weedless jig heads of the prior art, it is a primary object of the present invention to provide an attachment for a fishing hook to make the hook, particularly a treble hook, weedless. It is another object to provide a weedless hook attachment that can be used with a wide variety of fishing lures without significantly diminishing the action of the lure. It is yet another object of the present invention to provide a hook attachment that is disposable and that is quickly and easily attached to the fishing hook. Further objects and benefits of the present invention will be apparent from the following disclosure and accompanying figures.

SUMMARY OF THE INVENTION

A weedless hook attachment for use with a fishing hook having an eye and several barbs, includes a body having a central hub with several legs emanating radially therefrom. Each of the legs includes a free end adapted to conceal a corresponding one of the several barbs of the fishing hook. One of the several legs is a starter leg having a starter nub projecting from the free end of that leg. The starter nub has a diameter less than the diameter of said starter leg and is adapted to be severed from the starter leg after the starter leg and the starter nub have been threaded through the eye of the fishing hook.

In the preferred embodiment of the weedless hook attachment, the attachment includes three legs and is adapted for use with a treble hook. Each of the legs, other than said starter leg, includes an integral necked-down portion between the central hub and the remaining leg. When the starter leg has been threaded through the eye of the hook, the necked-down portions are situated within the eye of the fishing hook.

In the preferred embodiment, the weedless hook attachment is composed of a flexible, resilient, compressible material. Each of the legs has a diameter approximately equal to or greater than the effective diameter of the eye of the fishing hook. The starter nub has a diameter smaller than the diameter of the eye of the hook so that it can be used to pull the relatively larger starter leg through the eye. The starter leg is resiliently compressed when it is threaded through the eye of the fishing hook. Once the starter leg and necked-down portions are properly positioned, the starter nub can be severed and the legs impaled on the barbs of the treble hook.

DESCRIPTION OF THE PREFERRED EMBODIMENT

Figure 1:
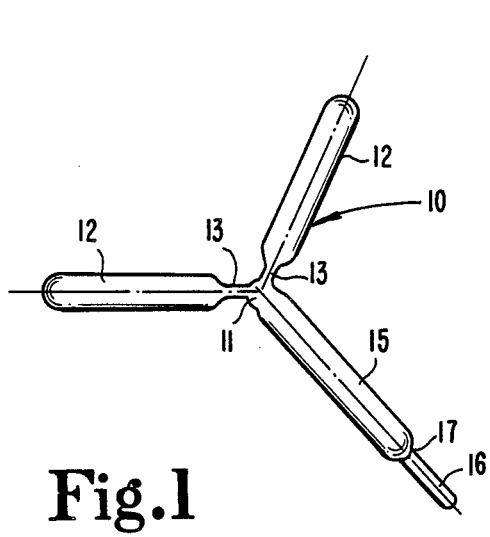
FIG. 1 is a top elevational view of the weedless hook attachment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The weedless hook attachment 10 of the present invention, as illustrated in FIG. 1, includes a central hub 11. A number of legs 12 and 15 emanate radially outwardly from the hub 11. Each of the legs 12 and 15 are evenly circumferentially spaced around the hub 11 to match the orientation of the individual hooks on a treble-type fishing hook. Two of the legs, such as legs 12 in FIG. 1, include a necked-down portion 13 between the leg and the central hub. Another leg 15 is generally integral with the central hub 11, lacking the necked-down portion of the legs 12. The leg 15 can be referred to as a "starter" leg for reasons that will be explained herein.

The starter leg 15 includes a starter nub 16 projecting outwardly from the free end or tip 17 of the starter leg. The starter nub 16 is significantly smaller in diameter than the starter leg 15 so that the nub can be easily severed from the starter leg 15 at the tip 17.

Figure 2:
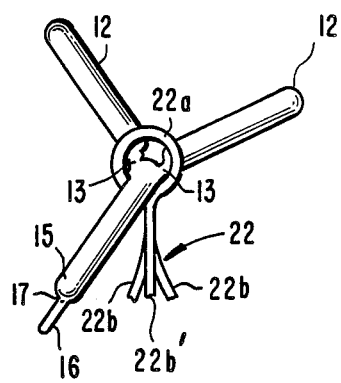
FIG. 2 is a perspective view of the weedless hook attachment of the present invention, shown with the attachment threaded through the eye of a treble hook.

The manner of use of the weedless hook attachment 10 is illustrated with reference to FIG. 2. A treble fishing hook 22 includes a split ring or an eye 22a that is used to connect the hook 22 to a fishing lure. The treble hook also includes three hook portions 22b integral with and extending from the eye 22a. It will be noted that for a typical treble hook, a hook portion 22b' will be directly aligned with the opening in the eye 22a. The remaining hook portions 22b are then evenly circumferentially spaced apart from the hook portion 22b', generally at sixty degree angles therefrom.

In the preferred method of using the weedless hook attachment 10 of the present invention, the starter leg 15 is threaded through the opening in the eye 22a of treble hook 22. In the preferred embodiment, the diameter of the starter leg 15, as well as the remaining legs 12, is equal to or greater than the diameter of the opening in the eye 22a. However, the diameter of the starter nub 16 is smaller than the opening in the eye 22a. The starter leg 15 can be pulled through the eye 22a by first threading the starter nub 16 through the eye and then pulling the starter leg through by using the starter nub 16. Once the starter leg 15 has been fully threaded through the opening in the eye 22a, the starter nub 16 can be cut, torn, or pinched off at the tip 17 of the starter leg 15.

In the preferred embodiment, the weedless hook attachment 10 is pulled through the eye 22a up to the hub 11 at a point where the necked-down segments 13 of the legs 12 are situated within the opening of the eye 22a. The weedless hook attachment 10 is then anchored on the treble hook 22 by the combined thickness of the legs 12 on one side of the eye 22a, and the starter leg 15 on the other side of the eye.

Figure 3:
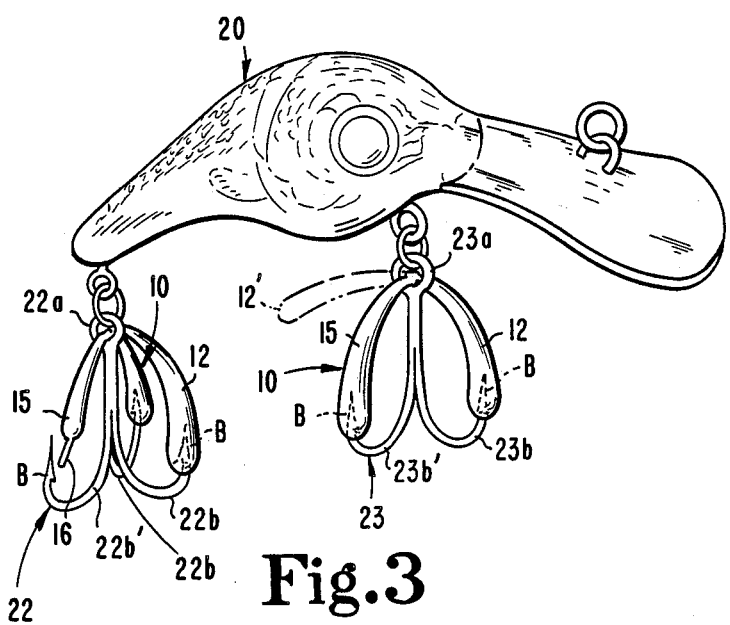
FIG. 3 is a perspective view of a fishing lure with two sets of hooks having the weedless hook attachment of the present invention engaged on each hook.

In FIG. 3, a lure 20 includes the treble hook 22 mounted at one end of the lure. Lure 20 is shown as a billed lure, although virtually any type of lure may be substituted. Once the weedless hook attachment 10 has been threaded through the eye 22a of the hook 22 as described, the legs 12 and 15 are in a position to be impaled or impaled on the barbs of the hook portions 22b and 22b'. As shown in FIG. 3, the barb ends B of hook portions 22b of hook 22 are fed into the free ends of the legs 12. When so attached, the legs 12 conceal the barbs B so that the barbs will not snag on underwater obstacles. Moreover, the legs bridge the space between the eye 22a and the barbs B to provide means to deflect the hook away from underwater obstacles that contact the legs.

In FIG. 3, the starter leg 15 is shown with the starter nub 16 still attached. However, once the weedless hook attachment 10 is properly oriented relative to the treble hook 22, the starter nub 16 can be severed from the starter leg 15, and the remaining hook portion 22b' can be fed onto the barb of hook portion 21b'.

The flexibility of the design of the weedless hook attachment 10 of the present invention is illustrated by the double hook 23 on the lure 20. In this instance, there are only two hook portions 23b and 23b' onto which the weedless hook attachment 10 can be attached. The hook attachment 10 is fed through the eye 23a in the normal fashion, as described above. However, once the hook attachment 10 is in place, only the starter leg 15 and one of the remaining legs 12 are fed onto the barbs B of the hook portions 23b' and 23b, respectively. The remaining leg 12', shown in phantom in FIG. 3, can be left dangling from the eye 23a; however, it is generally preferable to sever this leg 12' from the central hub 11 of the hook attachment 10. The necked-down portion 13 of the leg 12' simplifies the removal of this leg from the weedless hook attachment 10 when it is being used for a double hook. Since the legs 12 and 15 have diameters larger than the opening in the eye 23a, the weedless hook attachment 10 will remain properly anchored through the eye.

The dimensions of the features of the weedless hook attachment 10 of the present invention are determined by the size of the hook to which the device is to be attached. Thus, for a #6-4 treble hook, the legs 12 should be about 0.60 inches long with a diameter of 0.125 inches. The necked-down portions 13 of these legs are 0.062 inches long and 0.093 inches in diameter. The starter leg 15, because it lacks the necked-down portion, is approximately 0.662 inches long and 0.125 inches in diameter. The starter nub 16 is 0.25 inches long and 0.062 inches in diameter. The diameter dimensions of the features of weedless hook attachment 10 are determined by the size of the opening in the eye of the #6-4 treble hook. The lengths of the legs 12 and 15 are determined by the lengths of the hook portions, taking into account the distance from the eye to the barbs at the end of the hook portions.

In another important aspect of the present invention, the weedless hook attachment 10 of the preferred embodiment is composed of a flexible, resilient and compressible plastic, such as the plastic used for the traditional fishing worm. One type of plastic having the requisite properties is sold under the tradename "PLASTISOL" by Hilts Molds of Henderson, Nev. The hook attachment 10 can be made in a closed mold, formed in the shape of the hook attachment 10, and including a feed opening for pouring the liquid plastic into the mold. The plastic material of which the hook attachment 10 is composed may be colored as required to add color to or match the color of the lure 20 to which it is attached.

Although the plastic worm material used for this hook attachment is sufficiently resilient and compressible to enter the opening of an eye, it may be desirable to coat the starter leg 15 of the attachment with a mineral oil based fish formula to reduce the friction between the leg 15 and the eye opening. Using the fish formula, it is possible to thread a hook attachment 10 with a starter leg 15 having a diameter of 0.125 inches through an eye having a diameter of 0.1 inches. Thus, it is apparent that a single size hook attachment 10 can be used for a variety of hook sizes. While it is preferred that the hook have an eye that is smaller in diameter than the diameter of the legs 12 and 15, the hook attachment 10 can also be used where the eye of the treble hook is larger than the diameter of the legs, since the legs will be attached to the barbs on the ends of the hook portions of the treble hook. With the hook so attached, the weedless hook attachment 10 will not come loose even when the lure 20 is fly-casted into the water.

The weedless hook attachment 10 of the present invention can be used with almost any lure and with almost any type of lure action. Since the hook attachment 10 is lightweight, small and physically restricted generally within the space envelope of the treble hook itself, the effect of the hook attachment 10 on the action of the lure is minimal. Unlike the weedless jig heads of the prior art, the weedless hook attachment 10 of the present invention offers little drag to affect the wobbling, rolling, or spinning action of most lures. The weedless hook attachment 10 of the present invention may also be used as a hook protector for storage and handling of fishing lures.

Since the weedless hook attachment 10 is relatively thin and frail compared to the fishing lure and treble hook to which it is attached, the hook attachment 10 is usually destroyed when the lure is hit by a fish. When a fish strikes, or when the hook is set, the weedless hook attachment may be mutilated by the hook barbs, or a leg may be detached at the central hub 11. Since the weedless hook attachment 10 is composed of plastic, the attachment is adapted to be disposable, rather than reusable. The plastic material is inexpensive, so a fisherman may keep several of the present hook attachments in his tackle box. Since threading and anchoring the attachment 10 on a treble hook involves simple steps, the attachment can be quickly attached to a hook when another hook attachment has been lost after a strike.

The use of the starter nub 16 makes the weedless hook attachment 10 quick and easy to install on virtually any type of hook, provided that the eye of the hook is not exceedingly small relative to the diameter of the legs of the weedless hook attachment. The simplicity of this weedless hook attachment allows a fisherman to carry a large quantity of these hook attachments and install them while fishing in less than thirty seconds.

While the invention has been illustrated and described in detail in the drawings and foregoing description, the same is to be considered as illustrative and not restrictive in character. For instance, the weedless hook attachment of the present invention may include more than three legs to accommodate fishing hooks having more than three hook portions. In addition, the hook attachment may be composed of any suitable material having properties similar to the soft, flexible and resilient plastic described. It is understood that only the preferred embodiment has been shown and described and that all changes and modifications that come within the spirit of the invention are desired to be protected.

What is claimed is:

1. A weedless hook attachment for use with a fishing hook having an eye and several barbs, comprising:
    a body having a central hub with several legs emanating radially therefrom;
    each of said several legs including a free end adapted to conceal a corresponding one of said several barbs of the fishing hook;
    wherein, one of said several legs is a starter leg having a starter nub projecting from the free end of said starter leg, said starter nub having a diameter less than the diameter of said starter leg and being adapted to be severed from said starter leg; and
    further wherein at least said starter leg and said starter nub are adapted to be threaded through the eye of the fishing hook.

2. The weedless hook attachment according to claim 1, wherein:
    each of the remaining ones of said several legs, other than said starter leg, include an integral necked-down portion between said central hub and said remaining leg;
    wherein, said necked-down portions of said remaining legs have a combined effective diameter sufficiently small so that said necked-down portions can be situated within the eye of the fishing hook when said starter leg has been threaded through the eye.

3. The weedless hook attachment according to claim 1, wherein said body is composed of a flexible, resilient, compressible material.

4. The weedless hook attachment according to claim 3, wherein;
    said starter nub has a diameter less than the effective diameter of the eye of the fishing hook; and
    said starter leg has a diameter approximately equal to or greater than the effective diameter of the eye of the fishing hook, whereby said starter leg is resiliently compressed when said starter leg is passed through the eye of the fishing hook.

5. The weedless hook attachment according to claim 1, wherein each of said several legs is adapted to be impaled at its free end on one of the barbs of the fishing hook.

6. A method of attaching a weedless hook attachment, having a central hub with several legs emanating therefrom, to a fishing hook having an eye and several barbs, comprising the steps of:
    threading a starter leg through the eye of the fishing hook;
    impaling each of said several legs onto a corresponding one of the barbs of the fishing hook, adjacent a free end of each of said several legs.

7. The method of claim 6 of attaching a weedless hook attachment to a fishing hook, wherein the step of threading a starter leg includes the steps of:
    threading a starter nub, extending from a free end of said starter leg, through the eye of the fishing hook; and
    pulling said starter nub to thread said starter leg through the eye of the fishing hook.

8. The method of claim 7 of attaching a weedless hook to a fishing hook, further comprising, after the step of threading a starter leg, the step of:
    severing said starter nub from said starter leg.

9. The method of claim 6 of attaching a weedless hook to a fishing hook, wherein said hook attachment includes at least one more leg than the number of barbs of the fishing hook, wherein the step of impaling includes the steps of:
    impaling a corresponding one of said several legs to each of the barbs of the fishing hook; and
    severing said at least one more leg from said central hub of the weedless hook attachment.

10. The method of claim 6 of attaching a weedless hook to a fishing hook, wherein said step of threading a starter leg includes the step of:
    threading said starter leg through the eye of the fishing hook until a necked-down portion of each of the remaining ones of said several legs is situated within the eye of the fishing hook.

* * * * *